United States Patent [19]
Zappia

[11] 3,881,762
[45] May 6, 1975

[54] GRIPPER

[75] Inventor: Anthony T. Zappia, Indianapolis, Ind.

[73] Assignee: Ball Brothers Service Corporation, Muncie, Ind.

[22] Filed: Jan. 10, 1974

[21] Appl. No.: 432,408

Related U.S. Application Data

[62] Division of Ser. No. 321,003, Jan. 4, 1973, Pat. No. 3,826,382.

[52] U.S. Cl. ............... 294/93; 214/1 BD; 214/309; 294/63 A; 294/99 R
[51] Int. Cl. .............................................. B66c 1/46
[58] Field of Search ........ 294/63 R, 63 A, 64 R, 65, 294/81 R, 86 R, 86 A, 87 R, 88, 99 R, 93; 214/6 A, 309, 651, 655, 1 BD

[56] References Cited
UNITED STATES PATENTS

| | | |
|---|---|---|
| 1,110,409 | 9/1914 | Sutherland............................ 294/65 |
| 1,601,868 | 10/1926 | Luce .............................. 294/63 R X |
| 2,589,101 | 3/1952 | Leguillon et al. .......... 294/63 A UX |
| 2,609,113 | 9/1952 | Huffman .................... 294/63 A UX |
| 2,656,943 | 10/1953 | Nilsson .............................. 214/655 |
| 2,999,604 | 9/1961 | Chalich ........................ 294/87 R X |
| 3,474,917 | 10/1969 | Pearne et al. ................. 214/6 A UX |
| 3,716,264 | 2/1973 | Pearne et al. .................... 294/63 A |

Primary Examiner—Evon C. Blunk
Assistant Examiner—Johnny D. Cherry
Attorney, Agent, or Firm—Hood & Coffey

[57] ABSTRACT

A gripper assembly comprising a plurality of parallel arms each including an expansible diaphragm distendable toward a similar diaphragm on an adjacent arm, and means for distending and relieving said diaphragms.

6 Claims, 5 Drawing Figures

GRIPPER

This application is a division of co-pending application Ser. No. 321,003 filed Jan. 4, 1973, now U.S. Pat. No. 3,826,382

In many glassware manufacturing plants, the annealed ware is conducted to a case loader which transfers the ware into a container in which it will be shipped. In some instances, it is desirable to deliver the ware to such containers in an upright attitude while in other instances it is desirable to deposit the ware in the containers in an inverted attitude. Machines for performing each of these operations are well known, but I believe there is no existing machine prior to my invention which is capable of conversion, by a quick and easy manual adjustment, so to deliver the ware either bottom side down or bottom side up.

The primary object of my invention, as disclosed in said co-pending application, is to provide a machine for receiving glassware, in ranks and files, delivering the ware in such condition to a case, carton, tray or the like and which may be adjusted, by one man in a matter of seconds, to deliver the ware either upright or inverted.

The primary object of the invention as disclosed herein is to provide novel and improved means to grip a large number of like pieces, arranged in ranks and files, so that they may be transported and to do so without significant waste.

Further objects of the invention will appear as the description proceeds.

To the accomplishment of the above and related objects, this invention may be embodied in the form illustrated in the accompanying drawings, attention being called to the fact, however, that the drawings are illustrative only, and that change may be made in the specific construction illustrated and described, so long as the scope of the appended claims is not violated. In the drawings:

Figure 1:
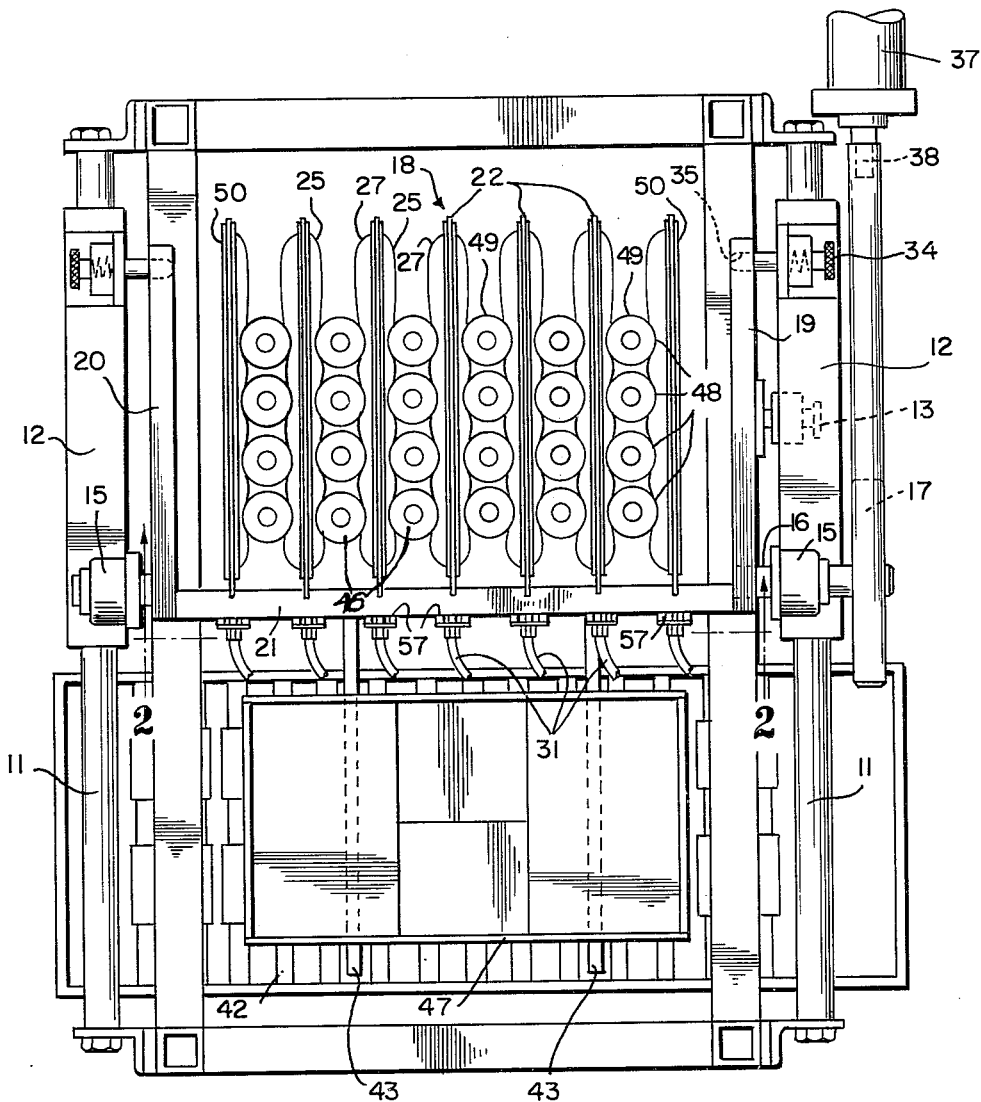
FIG. 1 is a plan view of a machine embodying a gripper constructed in accordance with the present invention and gripping a plurality of upright bottles arranged in ranks and files.
Figure 2:
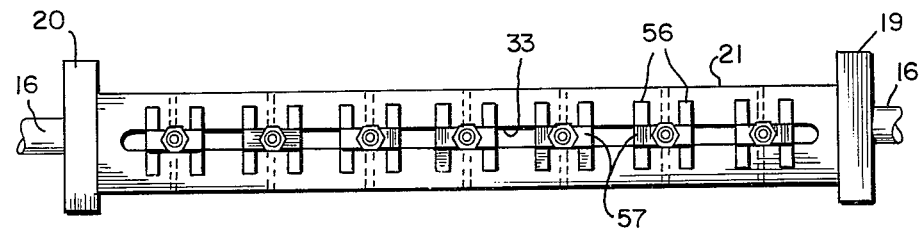
FIG. 2 is a section taken on the line 2—2 of FIG. 1.
Figure 3:
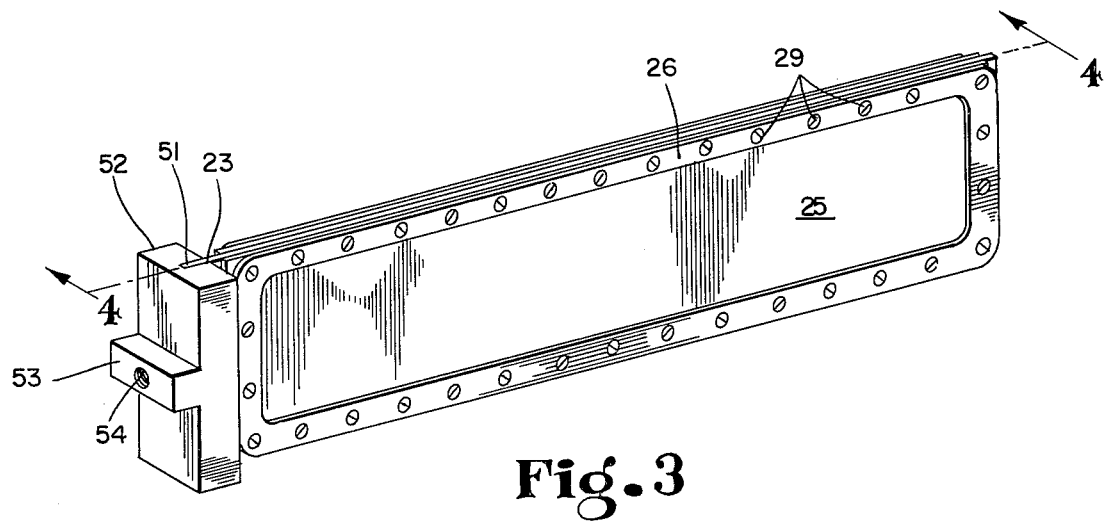
FIG. 3 is a perspective view of an individual gripper arm, greatly enlarged.
Figure 4:
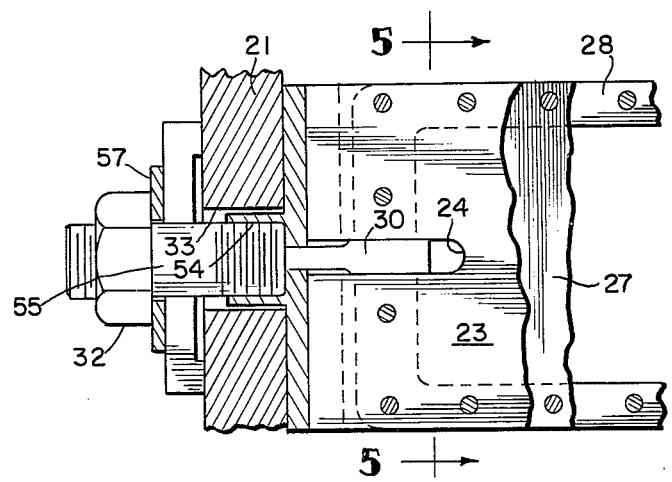
FIG. 4 is a fragmentary section, to a still larger scale, showing details of a gripper arm construction.
Figure 5:
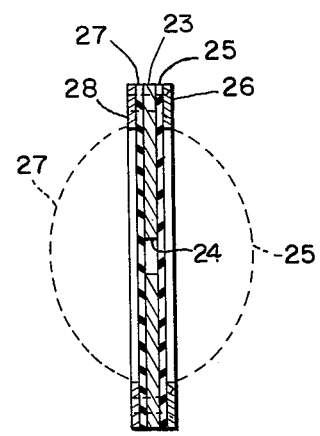
FIG. 5 is a section taken on the line 5—5 of FIG. 4.

Referring more particularly to the drawings, I have shown a main frame providing parallel guide rods 11, 11 upon which are slidably received parallel slide sleeves 12, 12 of a subframe. A spring pressed pin 13 carried by each sleeve 12 is adapted, at times, to engage in a dent (not shown) provided on the main frame.

Standards 15, 15 carried on the respective sleeves 12, provide journal mountings for a shaft 16 and a pinion 17 is fixed to the shaft 16.

A gripper assembly 18 embodies or is fixed to the shaft 16 and comprises lateral, rearwardly extending parallel arms 19 and 20 joined by a base 21 which is disposed substantially on the axis of the shaft 16.

The base 21 is formed with a longitudinal slot 33. In the illustrated embodiment of the invention, the assembly includes five identical arms 22 arranged between end arms which will be described. Each arm 22 comprises a relatively rigid plate 23 having its proximal end received in a groove 51 in one face of a block 52 provided on its opposite face with a batten 53, said batten 53 being receivable and slidably supported in the slot 33. A notch 24 is cut in the end of the plate 23 for a reason which will appear.

A rubberoid, elastic diaphragm 25 is laid against one face of the plate 23, a stainless steel ring 26 is then laid against the outer face of the diaphragm. A similar diaphragm 27 is laid against the opposite face of the plate 23 and a ring 28 is positioned to overlie the perimetral region of the diaphragm 27. Now, through the medium of multiple rivets 29, the assembly of plate 23, diaphragms 25 and 27 and rings 26, 28 is secured together to define an airtight space between the diaphragms into which the notch 24 opens. A hole 54 through the block 52 and batten 53 registers with the notch 24. A nozzle 30 is positioned partly within the notch 24 and communicates with a fitting 55 which, in turn, is threadedly received in the hole 54.

Two feet 56 are positioned on opposite sides of the hole 54 and a pressure member 57 spans and bears against the outer surfaces of said feet. A nut 32 is threaded on the outer end of the fitting 55 to bear against the pressure member 57. A flexible conduit 31 is connected to each fitting 55 and leads to a source of air under pressure (not shown). The end arms of the assembly are identical with the intermediate arms except that a rigid plate 50 replaces one diaphragm in each of the end arms.

It will be apparent that, when air under pressure is supplied to the gripper arms, the several diaphragms will be expanded or bulged outwardly so that articles disposed between adjacent arms will be flexibly and resiliently gripped between the diaphragm 25 of one arm and the diaphragm 27 of the next adjacent arm. By varying the pressure of the air supplied to the gripper elements, the amount of gripping pressure applied to articles such as, for instance, the bottles 46 can be infinitely varied.

A fluid motor comprises two relatively reciprocable elements. As shown, the cylinder 37 is fixed to the frame and the piston rod 38 carries at its distal region a rack suitably supported by guide means and meshing with the pinion 17.

In one kind of use, means (not shown) will be provided to bring bottles 46 to the gripper assembly 18 in ranks 48 of six bottles and files 49 of four bottles. When, for instance, four such ranks have been accumulated, the diaphragms will be inflated to grip all of the bottles and the fluid motor 37 will be energized. If the detent pin 34 is engaged in its notch or dent 35 and the detent means 13 is retracted, forward movement of the rack 39 will carry the carriage 12 forward or downwardly as viewed in FIG. 1, since the pinion 17 is restrained against rotation. The stroke of the motor 37 is so calibrated that its forward movement will carry the bottles 46 into registry with a carton, tray or the like which is disposed in an elevated position at the loading station.

When the loaded gripper assembly registers with a container 47 at a proper elevation, air will be exhausted from the spaces between the diaphragms 25 and 27, whereby the bottles will be released to drop into the container in upright attitude.

If, however, the pin 13 is engaged with its dent and the pin 34 is retracted, the carriage 12 will be held against reciprocation, the pinion 17 will be freed for rotation and the advance of the rack 39 will turn the pinion 17 in a counterclockwise direction to swing the arms 19 through an arc of 180°. The parts are so proportioned and designed that the position of the gripper means after such turning movement will register with a receptacle 47; and if air is exhausted from between the diaphragms of the gripper means, the bottles will be dropped into the receptacle in inverted attitude. Retraction of the piston rod 38 will, of course, return the pinion 17 to the position of FIG. 1.

I claim as my invention:

1. A bottle gripper element comprising a closed-perimeter frame defining an open region therein and formed to provide opposite, substantially parallel faces, each face defining an imperforate region extending perimetrally about said open region, a closure member spanning the open region of each such frame face and sealingly bearing upon the perimetral region of such face, at least one of said closure members being a rubberoid, elastic diaphragm, said closure members cooperating with the open region of said frame to define a chamber with said diaphragm being inflatable to expand outwardly from the plane of its respective face when fluid under pressure is injected into said chamber, said chamber having a port opening through a point in said frame perimeter, and a perimetral ring for securing said diaphragm in sealing engagement with its respective frame face, said perimetral ring having a rigid, non-yielding outer surface for engaging and guiding bottles for movement along said gripper element before inflation of said diaphragm.

2. The gripper element of claim 1 in which the other of said closure members is substantially rigid.

3. The gripper element of claim 1 in which each of said closure members is a rubberoid, elastic diaphragm.

4. A ware gripper assembly comprising a plurality of gripper elements, each gripper element comprising a plate formed to provide a perforate region and an imperforate region extending perimetrally about said perforate region, said imperforate perimetral region providing opposite, substantially parallel faces, a closure member spanning the perforate region of each such face and sealingly bearing upon the perimetral region of such face, at least one of said closure members being a rubberoid, elastic diaphragm, said closure members cooperating with the perforate region of said plate to define a chamber, said chamber having a port opening through a point in its perimeter, and each gripper element having an end extension on its plate, an elongated base having a longitudinal slot, a block for each gripper element, each block having a batten protruding from one face and slidably recieved in said slot, each block having a groove in its opposite face and transversely arranged relative to said batten and supportingly receiving said extension of a gripper element plate, each block and batten being formed with an internally threaded opening communicating with the port of its gripper element, an externally threaded tubular fitting seated in said opening and extending beyond the remote face of said base, clamp means for each fitting sleeved on its fitting and spanning said slot to bear on said base remote face, and means adjustable mounted on each fitting to bear on its associated clamp means to urge such clamp means into clamping engagement with said base.

5. A ware gripper assembly comprising a plurality of gripper elements, each gripper element comprising a plate formed to provide a perforate region and an imperforate region extending perimetrally about said perforate region, said imperforate perimetral region providing opposite, substantially parallel faces, a closure member spanning the perforate region of each such face and sealingly bearing upon the perimetral region of such face, at least one of said closure members being a rubberoid, elastic diaphragm, said closure members cooperating with the perforate region of said plate to define a chamber, said chamber having a port opening through a point in its perimeter, an elongated base having a longitudinal slot, a block for each gripper element, each block having a batten protruding from one face and slidably received in said slot, each block having one of said gripper elements secured to and projecting away from its opposite face, each block and batten being formed with an internally threaded opening communicating with the port of its gripper element, an externally threaded tubular fitting seated in said opening and extending beyond the remote face of said base, clamp means for each fitting sleeved on its fitting and spanning said slot to bear on said base remote face, and means adjustably mounted on each fitting to bear on its associated clamp means to urge such clamp means into clamping engagement with said base.

6. The assembly of claim 5 in which said adjustably mounted means is a nut threadedly mounted on its fitting outboard relative to its associated clamp means.

* * * * *